(12) United States Patent
Thacker et al.

(10) Patent No.: US 6,427,172 B1
(45) Date of Patent: Jul. 30, 2002

(54) METHOD AND APPARATUS FOR INTERNET CACHE CONTENT DELIVERY VIA A DATA DISTRIBUTION SYSTEM

(75) Inventors: John C. Thacker, Los Altos; Michael Wright, Hayward, both of CA (US)

(73) Assignee: CyberStar, L.P., Palo Alto, CA (US)

( * ) Notice: Subject to any disclaimer, the term of this patent is extended or adjusted under 35 U.S.C. 154(b) by 0 days.

(21) Appl. No.: 09/356,997

(22) Filed: Jul. 20, 1999

(51) Int. Cl.⁷ .............................................. G06F 15/16
(52) U.S. Cl. ....................... 709/235; 709/217; 709/219; 709/225; 709/226; 709/229
(58) Field of Search ................................ 709/200, 203, 709/217, 219, 225, 226, 229, 235

(56) References Cited

U.S. PATENT DOCUMENTS

| | | | | |
|---|---|---|---|---|
| 5,581,704 A | * | 12/1996 | Barbara et al. .............. 711/141 |
| 5,594,490 A | * | 1/1997 | Dawson et al. ................. 348/6 |
| 5,734,898 A | * | 3/1998 | He .............................. 707/203 |
| 5,787,470 A | * | 7/1998 | Blansett ..................... 29/91.1 |
| 5,802,292 A | * | 9/1998 | Mogul ......................... 709/203 |
| 5,878,218 A | * | 3/1999 | Maddalozzo, Jr. et al. . 709/213 |
| 5,878,223 A | * | 3/1999 | Becker et al. .............. 709/223 |
| 5,892,917 A | * | 4/1999 | Myerson ..................... 709/224 |
| 5,892,937 A | * | 4/1999 | Caccavale .................... 711/135 |
| 5,896,506 A | * | 4/1999 | Ali et al. ..................... 709/213 |
| 5,931,912 A | * | 8/1999 | Wu et al. ..................... 709/224 |
| 5,944,780 A | * | 8/1999 | Chase et al. ................. 709/201 |
| 5,987,233 A | * | 11/1999 | Humphrey ................... 709/217 |
| 5,991,306 A | * | 11/1999 | Burns et al. ................. 370/429 |
| 6,016,520 A | * | 1/2000 | Facq et al. .................... 710/33 |
| 6,038,601 A | * | 3/2000 | Lambert et al. ............ 709/226 |
| 6,085,193 A | * | 7/2000 | Malkin et al. ................ 707/10 |
| 6,085,226 A | * | 7/2000 | Horvitz ....................... 709/203 |
| 6,085,234 A | * | 7/2000 | Pitts et al. ................... 709/217 |
| 6,088,718 A | * | 7/2000 | Altschuler et al. .......... 709/203 |
| 6,098,064 A | * | 8/2000 | Pirolli et al. .................. 707/2 |
| 6,141,333 A | * | 10/2000 | Chavez, Jr. ................. 370/338 |
| 6,167,438 A | * | 12/2000 | Yates et al. ................. 709/216 |
| 6,282,542 B1 | * | 8/2001 | Carneal et al. ............... 707/10 |

* cited by examiner

*Primary Examiner*—Saleh Najjar
(74) *Attorney, Agent, or Firm*—Kenneth W. Float

(57) ABSTRACT

A cache system and caching methods that are used to improve data delivery service provided by a data distribution system. The present invention uses a master cache in which predictive harvesting of content is performed based upon probability distributions of individual caches satisfying requests from users. Content in the master cache is distributed to user sites by way of the data distribution system, and local caches at user sites are automatically loaded with incoming content.

19 Claims, 3 Drawing Sheets

METHOD AND APPARATUS FOR INTERNET CACHE CONTENT DELIVERY VIA A DATA DISTRIBUTION SYSTEM

BACKGROUND

The present invention relates generally to data distribution systems, and more particularly, to improved methods and apparatus for providing Internet cache content delivery using a data distribution system.

The assignee of the present invention has developed a data distribution system, and in particular, a satellite-based data distribution system, that is used to distribute data supplied by content providers to personal computers of clients. In order to allow clients to have improved response times to obtain data distributed by the data distribution system, an important aspect of the system was developed relating to caching services that addresses this need.

Several companies, including Inktomi, Cache Flow, and NetWork Appliance, for example, currently make cache appliances or specific software which are targeted at Internet service providers. SkyCache is currently operating caching services using satellite communications.

It would be an improvement to have a method and apparatus that provides Internet cache content delivery using a data distribution system.

SUMMARY OF THE INVENTION

The present invention provides for a cache system and caching method that is used to improve data delivery service provided by a data distribution system, such as a satellite-based data distribution system. The present invention uses a master cache in which predictive harvesting of content is performed based upon probability distributions of individual caches satisfying requests from their users (clients). Content in the master cache is distributed to user sites by way of the satellite-based data distribution system, and local caches at user sites are automatically loaded with incoming content. The use of the satellite-based data distribution system provides an efficient economic multiplier.

More specifically, an exemplary system comprises a master cache that receives content for distribution by the data distribution system to one or more users. A gateway receives content distributed by the data distribution system from the master cache. One or more local caches store the content received by the gateway destined for the one or more users. Harvesting software processes information from the master cache and the gateway that corresponds to probability distributions that the local caches satisfy requests from their respective users to predictively distribute the desired content to the respective users.

Content distributed by the data distribution system to the gateway is transferred into the local cache by creating a pseudo client on the gateway, receiving an interrupt at the pseudo client indicating that that content has arrived at the gateway, enabling the gateway as a sibling cache for the local cache, requesting content to be transferred from the sibling cache to the local cache, verifying that content has been transferred to the local cache during the transfer process, and disabling the gateway as a sibling cache of the local cache at the completion of the process. The local cache retrieved the content from the sibling cache until all content has been transferred.

The master cache is built by processing statistics derived from the master cache and the local cache to produces a list of content to add to the master cache and a list of content to delete from the master cache. A pseudo client is formed that retrieves and verifies the content to be added to the master cache. The verified content is then transmitted from the master cache to the local cache.

Caching is used to improve the response time of a user (client) that is served by the cache system employed in the data distribution system. Caching also benefits service providers by reducing communications costs between the service environment and the external world. Using satellite transmission services allows cost savings and response times to be further enhanced for a large number of service providers by allowing aggregation of their individual requests.

The use of the satellite-based data distribution system provides for efficient distribution of cache content over a wide geographical area thereby allows many user sites to simultaneously update their local caches. This reduces cost of terrestrial infrastructure for the individual user sites.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
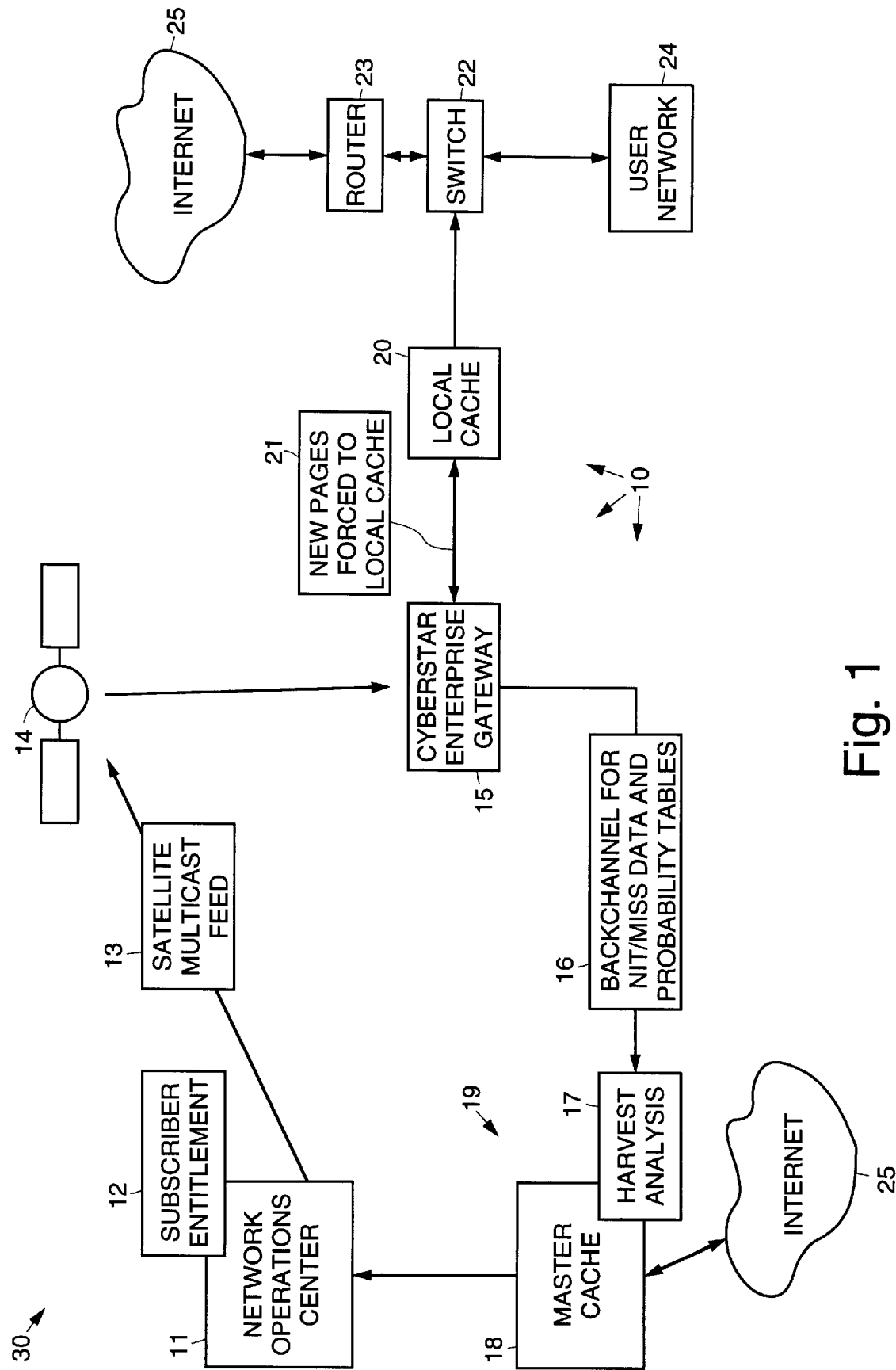
FIG. 1 illustrates the architecture of an exemplary caching system in accordance with the principles of the present invention used in conjunction with a satellite-based data distribution system.

Referring to the drawing figures, FIG. 1 illustrates the architecture of an exemplary caching system 10 in accordance with the principles of the present invention the invention is used in conjunction with a data distribution system 30, such as a satellite-based data distribution system 30 developed by the assignee of the present invention or an RF data distribution system, for example. An exemplary satellite-based data distribution system 30 comprises a network operations center 11 that includes subsystems and software that permits use of the data distribution system 30 by subscribers (users). This is illustrated as subscriber entitlement 12.

The subscriber entitlement subsystem originates entitlement messages, which activates the entitled gateways to decode the data transmitted over the data distribution system 10.

The satellite-based data distribution system 30 distributes content received from service providers by means of a satellite multicast feed 13 distributed by way of a satellite 14 to a gateway 15, referred to as a CyberStar Enterprise Gateway 15, and which is part of the present caching system 10. The content is typically transmitted in the form of http (hypertext transport protocol) objects such as web pages or nttp (News text transport protocol) objects such as news groups.

Content received by the gateway 15 is transferred to a local cache 20 which is typically located on a user computer or server computer at a user site. For example, the content is stored in the local cache 20 on a server computer and is transferred to a user computer that is coupled to a user network 24 by way of a switch 22, for example. A router 23 is used to connect the user network 24 to the Internet 25.

The exemplary caching system 10 also includes a master cache 18 and harvesting software 17 that is typically disposed on a computer 19 at the network operations center 11. The computer 19 is coupled to the Internet 25 and receives content from content providers for distribution. The computer 19 is coupled by way of a backchannel 16 to the gateway 15. The backchannel 16 may be implemented in a variety of ways, including a dedicated narrowband circuit (telephone), a virtual private narrowband channel, or an internet connection, for example. The backchannel 16 is used to transmit hit/miss data and probability tables from the gateway 15 to the computer 19, and the harvesting software 17 processes information contained in the transmit hit/miss data and probability tables.

Figure 2:
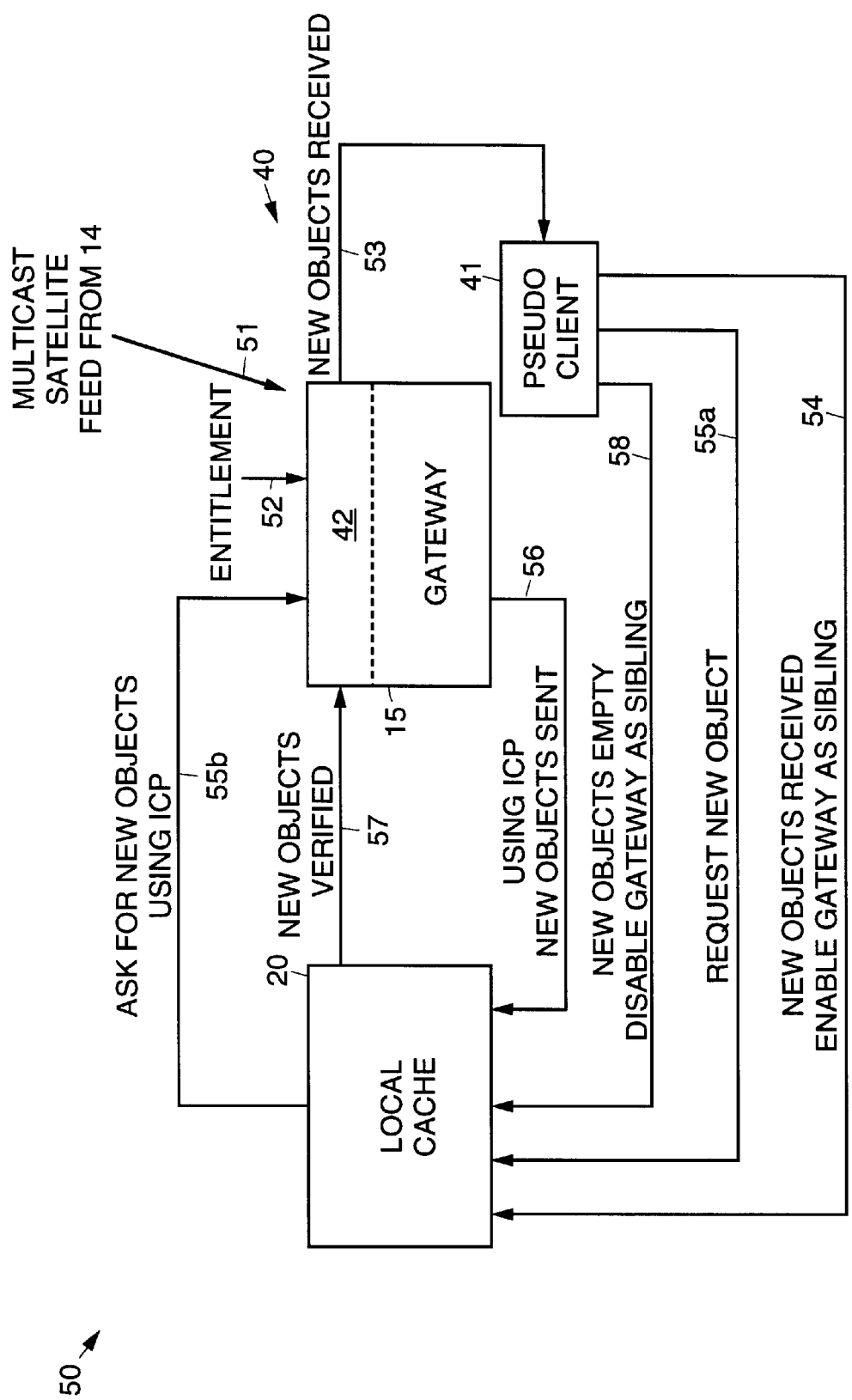
FIG. 2 illustrates exemplary apparatus and a method in accordance with the present invention for forcing content into a local cache.

FIG. 2 illustrates exemplary apparatus 40 and a method 50 in accordance with the present invention for forcing content into the local cache 20. The apparatus 40 comprises the gateway 15 which is coupled to the local cache 20 as discussed with reference to FIG. 1. The method 50 is implemented in the gateway 15 and processes content received from the satellite 14, typically in the form of a multicast satellite feed. The method 50 comprises the following steps.

Received content 51 is forced into the local cache 20 using the method 50 as follows. An entitlement message is received 52 by the gateway 15 from the subscriber entitlement subsystem that notifies 53 a pseudo client 41 that new objects have arrived. The pseudo client 41 is a computer program which runs on the gateway computer and uses the appropriate communication protocol to communicate with the local cache. An example of this protocaol is ICP (Internet Cache Protocol). However, the protocol may also be a proprietary one from a number of cache hardware vendors. The pseudo client 41 also has processes that allow it to control or designate the presedence relationship between the local cache and the gateway.

The pseudo client 41 enables 54 the gateway 15 as a sibling cache 42 for the local cache 20. The standard Internet Protocol (IP), or Internet Cache Protocol (ICP), is used to communicate between the local cache 20 and the sibling cache 42. The pseudo client 41 then requests 55a the new objects 53 having arrived on the sibling cache 42. This request 55a makes use of standard control settings which force the local cache 20 to render any objects resident at the local cache as unable to satisfy the request 55a. The local cache 20 then requests 55b the object from its sibling cache 42. The sibling cache 42 complies by sending 56 the object to the local cache 20. The local cache 20 in turn forwards the object to the pseudo client 41 thus verifying 57 the object has been transferred to the local cache 20. The pseudo client 41 continues to request 55a objects from the local cache 20 until all the new objects have been transferred to the local cache 20. During the transfer process, the pseudo client 41 verifies 57 that all pages have been transferred to the local cache 20. At the completion of the process, the pseudo client 41 disables 58 the gateway 15 as a sibling cache 42 of the local cache 20.

Figure 3:
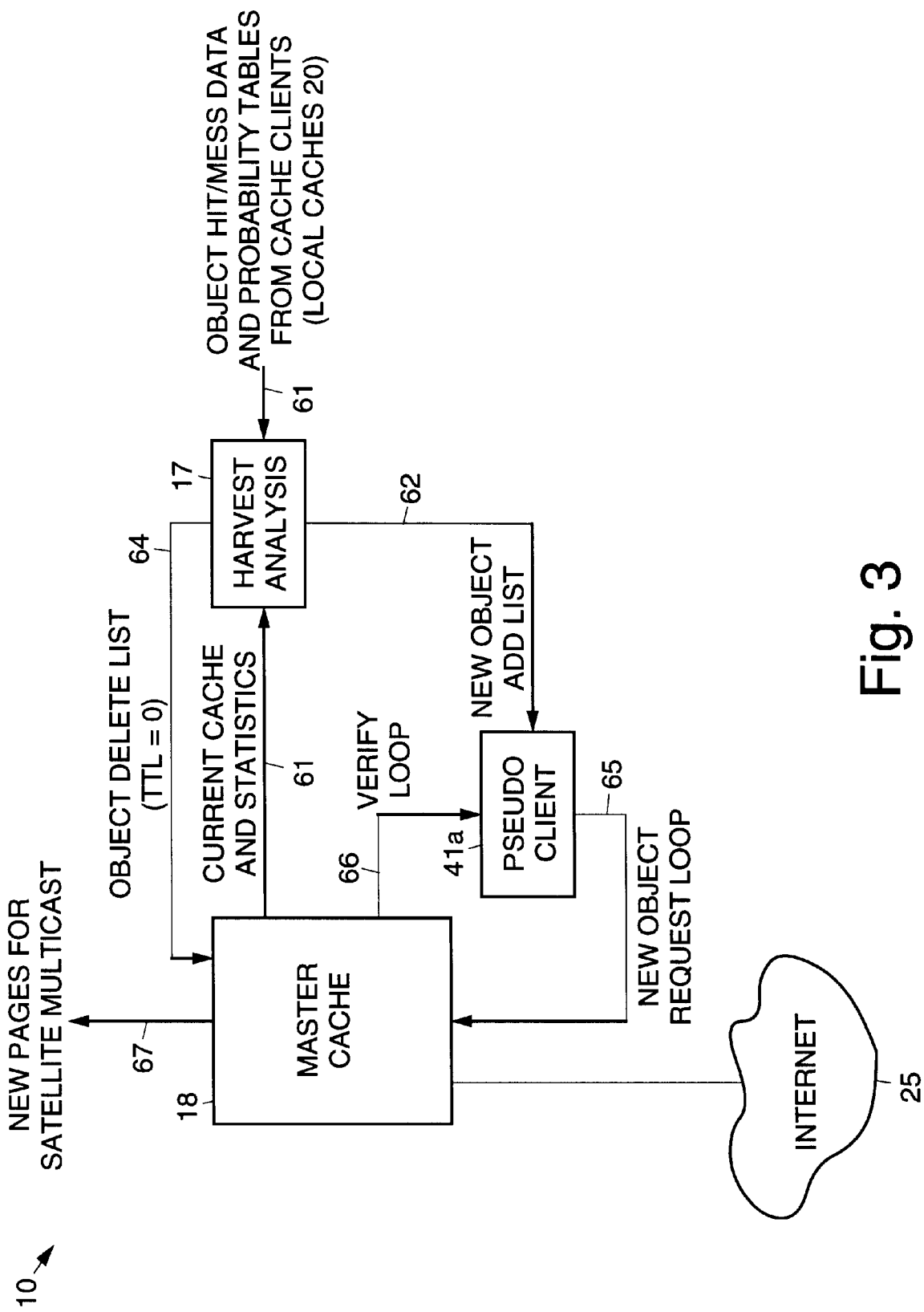
FIG. 3 illustrates an exemplary method in accordance with the present invention for building the master cache.

FIG. 3 illustrates an exemplary method 60 in accordance with the present invention for building the master cache 18. The harvest analysis software 17 processes statistics 61 from the master cache 18 and all local caches 20. Parameters and statistics used by the harvest analysis software are, for example, time to live (TTL) the number of times an object was requested, the number of times an object was requested and satisfied by local cache 20 (Hit), the number of times an object was requested and satisfied by a server other than the local cache 20 (miss). Objects are added/dropped according to high miscounts and low hit counts. The TTL parameter can also be adjusted to reduce the object's miss count. The statistics are collected by the local cache 20 as part of its normal operation. These statistics are periodically transferred to the gateway 15.

The harvest analysis software 17 produces a list 62 of objects (corresponding to each item of content) to add to the master cache 18 and a list 64 of objects to delete from the master cache 18. A pseudo client 41a is used to retrieve 65 and verify 66 the objects to be added to the master cache. The master cache forwards 67 the content to the satellite NOC for transmission according to various distribution policies. The satellite NOC adds a level of conditional access onto the transmission stream to provide service to only those sites which have been entitled to the cache service.

Thus, an improved method and apparatus for providing Internet cache content delivery using satellite transmission services have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A caching system for use with a data distribution system, comprising:

a master cache for receiving content for distribution by the data distribution system to one or more users;

a gateway for receiving content that is distributed by the data distribution system from the master cache;

one or more local caches for storing the content received by the gateway destined for the one or more users; and harvesting software coupled to the master cache and the gateway for processing information corresponding to probability distributions that the local caches satisfy requests from their respective users to predictively distribute the desired content to the respective users.

2. The system recited in claim 1 wherein the harvesting software processes information contained in transmit hit/miss data and probability tables generated at the gateway.

3. The system recited in claim 1 wherein the content comprises http objects.

4. The system recited in claim 1 wherein the content comprises nttp objects.

5. The system recited in claim 1 wherein the gateway comprises:

at pseudo client for receiving an entitlement message indicating that that content has arrived at the gateway, for enabling the gateway as a sibling cache for the local cache for requesting content to be transferred from the sibling cache to the local cache, for verifying that content has been transferred to the local cache during the transfer process, for disabling the gateway as a sibling cache of the local cache at the completion of the process:

and wherein the local cache retrieves the content from the sibling cache until all content has been transferred.

6. The system recited in claim 5 wherein the Internet Protocol is used to communicate between the local cache and the sibling cache.

7. The system recited in claim 5 wherein the Internet Cache Protocol is used to communicate between the local cache and the sibling cache.

8. The system recited in claim 1 wherein the harvesting software:
processes statistics derived from the master cache and the local caches to produces a list of content to add to the master cache and a list of content to delete from the master cache;
forms a pseudo client to retrieve and verify the content to be added to the master cache; and
transmits the verified content from the master cache to the local caches.

9. The system recited in claim 1 wherein the harvesting software:
processes statistics derived from the master cache and the local caches to produces a list of content to add to the master cache and a list of content to delete from the master cache;
forms a pseudo client to retrieve and verify the content to be added to the master cache; and
transmits the verified content from the master cache to the local caches.

10. The system recited in claim 1 wherein the data distribution system, comprises a satellite-based data distribution system.

11. A method for transferring content distributed by a data distribution system to a gateway into a local cache, comprising the steps of:
creating a pseudo client on the gateway;
receiving an interrupt at the pseudo client indicating that that content has arrived at the gateway;
enabling the gateway as a sibling cache for the local cache;
requesting content to be transferred from the sibling cache to the local cache;
verifying that content has been transferred to the local cache during the transfer process;
disabling the gateway as a sibling cache of the local cache at the completion of the process; and
causing the local cache to retrieve the content from the sibling cache until all content has been transferred.

12. The method recited in claim 11 wherein the data distribution system, comprises ma satellite-based data distribution system.

13. A method for building a master cache used to transfer content by way of a data distribution system to a local cache, comprising the steps of:
processing statistics derived from the master cache and the local cache to produces a list of content to add to the master cache and a list of content to delete from the master cache;
forming a pseudo client to retrieve and verify the content to be added to the master cache; and
transmitting the verified content from the master cache to the local cache.

14. The method recited in claim 13 wherein the step of processing statistics comprises the step of processing information corresponding to probability distributions that the local caches satisfy requests from their respective users to predictively distribute the desired content to the respective users.

15. The method recited in claim 13 wherein the step of processing statistics comprises the step of processing information contained in transmit hit/miss data and probability tables.

16. A caching system for use with a data distribution system, comprising:
a master cache for receiving content for distribution by the data distribution system to one or more user computers,
a gateway that is distinct from the one or more user computers for receiving content that is distributed by the data distribution system from the master cache;
one or more local caches for storing the content received by the gateway destined for the one or more user computers; and
harvesting software coupled to the master cache and the gateway for processing information corresponding to probability distributions that the local caches satisfy requests from their respective users to predictively distribute the desired content to the respective user computers.

17. The system recited in claim 16 wherein the harvesting software processes information contained in transmit hit/miss data and probability tables generated at the gateway.

18. The system recited in claim 16 wherein the gateway comprises:
a pseudo client for receiving an entitlement message indicating that that content has arrived at the gateway, for enabling the gateway as a sibling cache for the local cache, for requesting content to be transferred from the sibling cache to the local cache, for verifying that content has been transferred to the local cache during the transfer process, for disabling the gateway as a sibling cache of the local cache at the completion of the process;
and wherein the local cache retrieves the content from the sibling cache until all content has been transferred.

19. The system recited in claim 16 wherein the data distribution system, comprises a satellite-based data distribution system.

* * * * *